United States Patent [19]

Machol

[11] Patent Number: 5,719,705
[45] Date of Patent: Feb. 17, 1998

[54] ANTI-STATIC ANTI-REFLECTION COATING

[75] Inventor: Steven N. Machol, Sebastopol, Calif.

[73] Assignee: Sola International, Inc., Menlo Park, Calif.

[21] Appl. No.: 487,365

[22] Filed: Jun. 7, 1995

[51] Int. Cl.⁶ .................................................. G02B 1/10
[52] U.S. Cl. ........................... 359/581; 359/582; 359/585; 427/164
[58] Field of Search ..................................... 359/581, 582, 359/585, 507; 351/62; 427/164

[56] References Cited

U.S. PATENT DOCUMENTS

| | | | |
|---|---|---|---|
| 3,708,225 | 1/1973 | Misch et al. | 351/160 |
| 3,962,488 | 6/1976 | Gillery | 427/109 |
| 4,611,892 | 9/1986 | Kawashima et al. | 359/581 |
| 4,957,358 | 9/1990 | Terada et al. | 359/512 |
| 5,181,141 | 1/1993 | Sato et al. | 359/581 |
| 5,190,807 | 3/1993 | Kimock et al. | 428/216 |
| 5,362,552 | 11/1994 | Austin | 359/588 |
| 5,372,874 | 12/1994 | Dickey et al. | 428/216 |
| 5,508,135 | 4/1996 | Lelental et al. | 430/63 |
| 5,536,580 | 7/1996 | Ikadai et al. | 359/586 |
| 5,541,770 | 7/1996 | Pellicori et al. | 359/585 |
| 5,582,919 | 12/1996 | Ikadai et al. | 359/585 |

FOREIGN PATENT DOCUMENTS

| | | | |
|---|---|---|---|
| 0203730 | 12/1986 | European Pat. Off. | 359/581 |
| 53-28214 | 8/1978 | Japan | G02B 1/10 |
| A 62-244001 | 10/1987 | Japan | 359/581 |

*Primary Examiner*—Paul M. Dzierzynski
*Assistant Examiner*—John Juba, Jr.
*Attorney, Agent, or Firm*—Burns, Doane, Swecker & Mathis, L.L.P.

[57] ABSTRACT

An anti-reflection coating that is soil resistant and easy to maintain is provided. The coating includes a multilayer film having alternating layers of high and low refractive index materials that comprise electrically conductive metal oxides. The film is formed by reacting metal with non-stoichiometric amounts of oxygen such that the coating has one or more layers of electrically conductive metal oxide material. The coating is particularly suited for ophthalmic applications.

47 Claims, 2 Drawing Sheets

ANTI-STATIC ANTI-REFLECTION COATING

FIELD OF THE INVENTION

The present invention relates to anti-reflection coatings for transparent substrates such as ophthalmic lens and particularly to a method of fabricating anti-reflection coatings that are anti-static and easy to clean.

BACKGROUND OF THE INVENTION

Ophthalmic lenses have traditionally been formed as a single integral body of glass or plastic. Recently, lenses have been fabricated by laminating two lens wafers together with transparent adhesive. Regardless of how it is constructed, an ophthalmic lens can include an anti-reflection coating to improve transmittance of visible light.

Conventional anti-reflection coatings comprise multilayer structures described for instance, in U.S. Pat. Nos. 3,432,225 and 3,565,509. Conventional anti-reflection coatings have a hydrophobic outer layer, which typically comprises a fluoroalkylchlorosilane, to promote soil resistance and facilitate cleaning. Despite the presence of this outer layer, ophthalmic lens surfaces nevertheless tend to attract airborne particles. Furthermore, oil contaminants on the lens surface tend to smudge rather than wipe off cleanly, making the lenses difficult to maintain.

SUMMARY OF THE INVENTION

The present invention is directed to transparent articles such as ophthalmic lens that are coated with an anti-reflection coating with inherent anti-static properties. In addition to not attracting dust and other air-borne contaminants, the durable inventive anti-reflection coating is also easy to clean. Anti-reflection coatings of the present invention do not require a hydrophobic outer layer.

Accordingly, one aspect of the invention is directed to a method of fabricating a high transmittance article which comprises the steps of: providing a transparent substrate; and forming, on a surface of said substrate, a transparent, electrically conductive anti-reflection coating.

Another aspect of the invention is directed to a method of fabricating a high transmittance article which comprises the steps of:

providing a transparent substrate; and forming, on a surface of said substrate, a transparent multilayer anti-reflection coating wherein at least one layer comprises an electrically conductive high refractive index material or an electrically conductive low refractive index material.

A feature of the invention is that the coating can be formed by reacting metal with oxygen such that the coating comprises one or more layers of electrically conductive metal oxide material. Techniques for accomplishing this include electron beam reactive evaporation, ion-assisted deposition, and reactive sputtering of metal targets.

In yet another aspect, the invention is directed to a high transmittance article comprising:

a transparent substrate; and a transparent multilayer film comprising alternating layers of electrically conductive high refractive index and electrically conductive low refractive index materials.

In a further aspect, the invention is directed to a substantially static resistant ophthalmic lens fabricated by a process that comprises the steps of:

providing a transparent substrate; and depositing, onto a surface of said substrate, a transparent multilayer anti-reflection coating wherein each layer comprises an electrically conductive high refractive index or an electrically conductive low refractive index material.

In another aspect, the invention is directed to a substantially anti-static ophthalmic lens fabricated by a process that comprises the steps of:

providing a transparent substrate; and depositing, onto a surface of said substrate, a transparent multilayer film comprising alternating layers of high refractive index and low refractive index materials wherein each layer is electrically conductive.

In a preferred embodiment, the multilayer film comprises:

(i) a first layer having an index of refraction from about 2.0 to about 2.55 and comprising a first metal oxide material;

(ii) a second layer having an index of refraction from about 1.38 to about 1.5 and comprising a second metal oxide;

(iii) a third layer having an index of refraction from about 2.0 to about 2.55 and comprising the first metal oxide material; and (iv) a fourth layer having an index of refraction from about 1.38 to about 1.5 comprising the second metal oxide, wherein the indices of refraction are measured at a reference wavelength of 550 nanometers.

In a preferred embodiment, the third layer is electrically conductive. In yet another preferred embodiment, the first and third layers comprise high refractive index materials selected from the group consisting of titanium oxides niobium oxides, and tantalum oxides and the second and fourth layers comprise silicon dioxide. For substrates that comprise ophthalmic lens, the lens surface preferably has an electric potential that is less than about 100 volts.

DESCRIPTION OF THE PREFERRED EMBODIMENTS

The present invention is based in part on the discovery that increasing the electrical conductivity in one or more layers of a multilayer anti-reflection coating confers the coating with anti-static characteristics. Indeed, even when subjected to frictional forces, the inventive anti-reflection coating does not develop any appreciable amount of electrostatic charge.

The inventive anti-reflection coating demonstrates improved resistance to dirt and stains as well, thereby obviating the need for employing a hydrophobic outer layer over the anti-reflection coating. The presence of this hydrophobic outer layer can adversely effect the optical characteristics of the ophthalmic lenses including, for instance, color consistency and reflectivity, and increase their production costs.

However, prior to describing the invention is further detail, the following terms will be defined:

The term "substrate" refers to a material which preferably has superior structural and optical properties. Crystalline quartz, fused silica, soda-lime silicate glass, and plastics such as from polymers based on allyl diglycol carbonate monomers (available as CR-39™ from PPG Industries, Inc., Hartford, Conn.) and polycarbonates such as Lexan™, available from General Electric Co., are preferred substrate materials. Substrates include ophthalmic lenses (including sunglasses). Preferred ophthalmic lenses also include laminated lenses that are fabricated by bonding two lens wafers (i.e., a front wafer and a back wafer) together with a transparent adhesive. Laminated lens wafers are described, for example, in U.S. Pat. Nos. 5,149,181, 4,857,553, and 4,645,317 and U.K. Patent Application, GB 2,260,937A, all of which are incorporated herein. Commercially available plastic ophthalmic lenses that are coated with a polymeric scratch resistance coating that may be about 1 μm to about 12 μm thick are also suitable substrates. The thickness of the polymeric scratch resistance coating will depend, in part, on the substrate material. Generally, plastic materials such as polycarbonates will require thicker coatings. Suitable substrates further include glass ophthalmic lenses, as described, for instance, in U.S. Pat. Nos. 3,899,315 and 3,899,314, both of which are incorporated herein. As used herein the term "lens" refers to both single integral body and laminated types.

The term "anti-reflection coating" or "AR coating" refers to a substantially transparent multilayer film that is applied to optical systems (e.g., surfaces thereof) to substantially eliminate reflection over a relatively wide portion of the visible spectrum, and thereby increase the transmission of light and reduce surface reflectance. Known anti-reflection coatings include multilayer films comprising alternating high and low refractive index materials (e.g., metal oxides) as described, for instance, in U.S. Pat. Nos. 3,432,225, 3,565,509, 4,022,947, and 5,332,618, all of which are incorporated herein. However, unlike prior art AR coatings, the inventive AR coatings employ one or more electrically conductive high and/or electrically conductive low refractive index layers. The thickness of the AR coating will depend on the thickness of each individual layer in the multilayer film and the total number of layers in the multilayer film. The inventive AR coating can include any number of layers. Preferably, the AR coating for the ophthalmic lens has about 3 to about 12 layers, more preferably about 4 to about 7 layers, and most preferably about 4 layers. Preferably, the AR coating is about 100 to about 750 nm thick. For use with ophthalmic lenses, the AR coating is preferably about 220 to about 500 nm thick.

The term "adhesion layer" refers to a film or coating that is formed on the transparent substrate prior to depositing the multilayer film of the anti-reflection coating. The adhesion layer promotes bonding of the anti-reflection coating to the substrate. Any suitable transparent material can be used to form the adhesion layer including chromium oxide. Use of an adhesion layer is optional and the choice of material employed will depend, in part, on the substrate material and the material comprising the first layer of the multilayer anti-reflection coating. The thickness of the adhesion layer is not critical although it is preferably kept to a thickness just sufficient to effectively bond the substrate to the anti-reflection coating but not to have a significant optical effect. If the chromium is not oxidized sufficiently or if the adhesion layer is too thick, then this layer will cause absorption of light and reduce transmission through the AR coating. The adhesion layer may be electrically conductive which may further enhance the anti-static characteristics of the multilayer anti-reflection coating.

The term "high refractive index material" refers to materials having an index of refraction (at a referenced wavelength of about 550 nm) that is preferably greater than about 2.0, more preferably from about 2.1 to about 2.55, and most preferably from about 2.2 to about 2.4.

The term "low refractive index material" refers to materials having an index of refraction (at a referenced wavelength of about 550 nm) that is preferably less than about 1.5, more preferably from about 1.38 to about 1.5, and most preferably from about 1.45 to about 1.46.

The term "anti-static" refers to the ability of a material not to retain or develop an appreciable amount of electrostatic charge. With respect to an ophthalmic lens coated with the anti-reflection coating of the present invention, the lens surface preferably remains substantially electrostatically neutral wherein the coated lens surface has an electric potential that is less than about 100 volts, more preferably less than about 75 volts, and most preferably less than about 50 volts, when measured in the neutral state or discharged state. By "neutral state" or "discharged state" is meant that the lens surface has not been subject to friction or other electrostatic charge generating processes or devices within about 5 seconds prior to measurement. Conversely, the "charged state" refers to the condition of a lens immediately, and up to about 5 seconds, after being subject to friction or other electrostatic charge generating processes or devices.

Preferably, for an ophthalmic lens coated with the anti-reflection coating, the coated lens surface has an electric potential that is less than about 600 volts, and preferably about 0 to about 500 volts, and most preferably about 0 to about 300 volts or less when measured immediately after being rubbed with a cloth made of a synthetic (e.g., polyester) or natural (e.g., cotton) material. Further, for an ophthalmic lens coated with the anti-reflection coating, preferably, the coated lens surface has an electric potential that is less than about 100 volts, more preferably about 0 to about 75 volts or less, and most preferably about 0 to about 50 volts or less within about 5 seconds after being rubbed. As is apparent, one of the features of the inventive AR coating is its ability to discharge or dissipate electric charge and prevent charge buildup.

For purposes of this invention, volts shall include the magnitudes of both positive and negative voltages so that a lens surface having an electric potential of 100 volts or less, covers the range from −100 to +100 volts.

A preferred method of fabricating a conductive AR coating is to employ electrically conductive high and low refractive index materials that comprise metal oxides. Metal oxides with high refractive indices include, for example, oxides of titanium, cerium, bismuth, zinc, iron, niobium, tantalum, zirconium, chromium, tin, indium, and mixtures thereof. Particularly preferred electrically conductive high refractive index materials are niobium oxides and titanium oxides derived by reactive sputtering or evaporation. Metal oxides with low refractive indices include, for example, oxides of silicon; suitable low refractive index materials also include aluminum oxyfluoride and magnesium oxyfluoride. Alternatively, one or more of the metal oxide materials can be replaced with non-oxide materials having the requisite refractive index. For instance, zinc sulfide can be used in electrically conductive high refractive index material and magnesium fluoride and thorium fluoride can be employed in electrically conductive low refractive index materials. These non-oxides are described in U.S. Pat. No. 5,332,618.

The multilayer film, which forms the inventive AR coating, comprises at least one layer that is electrically conductive. It is believed that the presence of the one or more electrically conductive layer effectively prevents appreciable electrostatic charge buildup by continuously discharging the same. The result is an AR coating which is anti-static.

The terms "electrically conductive high refractive index material" and "electrically conductive low refractive index material" refer to a high and low refractive index materials that are suitable for use in conductive anti-reflection coatings. Preferably, an electrically conductive high refractive index material comprises a metal oxide having a high refractive index. Conversely, an electrically conductive low refractive index material comprises a metal oxide having a low refractive index.

A preferred method of fabricating such materials is to synthesize a metal oxide in an environment so that the metal oxide film produced is non-stoichiometric or sub-oxidized. The resulting metal oxide film has the electrical properties described above.

As further described herein, in non-stoichiometric metal oxides the ratio of oxygen to metal is less than the theoretical stoichiometric ratio for any particular structure. (Metal oxides wherein the ratio of metal to oxygen is stoichiometric are generally referred to as dielectric materials that are non-electrically conductive.) However, the electrically conductive materials can also comprise a mixture of (1) stoichiometric metal oxides and (2) stoichiometric oxides and/or non-reacted metal atoms. Methods of synthesizing non-stoichiometric metal oxides include reactive sputtering and evaporating of metal in oxygen deficient environments.

It is known that stoichiometric titanium dioxide (i.e., $TiO_2$) has a specific conductivity of less than $10^{-10}$ S/cm whereas $TiO_{1.9995}$ yields a value of $10^{-1}$ S/cm. Thus it is expected that suitable electrically conductive high refractive index materials can be fabricated by reacting titanium with a non-stoichiometric amount of oxygen such that the titanium oxide produced has the nominal formula $TiO_x$ wherein x is less than 2, preferably about 1.3 to about 1.9995, more preferably about 1.5 to about 1.9995, and most preferably about 1.7 to about 1.9995.

It is believed that $TiO_2$ is the predominant form of titanium oxide formed. However, it is believed that other forms are produced as well. Thus, unless otherwise stated, $TiO_x$ will represent all forms of titanium oxide produced. It should be noted that when employing titanium oxides as the layer of electrically conductive high refractive index material, the particular structure of the titanium oxides produced is not critical so long as the layer has the desired optical characteristics (e.g., refractive index and transparency) necessary for the anti-reflection coating, and the coated ophthalmic lens has the anti-static properties defined above.

When the inventive AR coating is a multilayer film comprising a layer of electrically conductive low refractive index material, it is expected that suitable electrically conductive low refractive index materials can be fabricated by reacting silicon with a non-stoichiometric amount of oxygen such that the silicon oxide has the nominal formula $SiO_x$ wherein x is less than 2, preferably about 1.5 to about 1.99, more preferably about 1.7 to about 1.99 and most preferably 1.8 to about 1.99.

Similarly, it is believed that $SiO_2$ is the predominant form of silicon oxide formed. However, it is believed that other forms are produced as well. Thus, unless otherwise stated, $SiO_x$ will represent all forms of silicon oxides produced. Likewise, when employing silicon oxides as the layer of electrically conductive low refractive index material, the particular structure of the silicon oxides produced is not critical so long as the layer has the desired optical characteristics necessary for the anti-reflection coating and the coated ophthalmic lens has the anti-static properties.

Thus, in general, when employing metal oxide materials to construct either a layer of low or high refractive index material, the particular formula or structure of the metal oxide is not critical so long as the layer has the desired optical properties. In the case of forming a layer of electrically conductive low or high refractive index material, the other criterion is that the anti-reflection coating has the anti-static properties.

Since only one or more layers of the multilayer film of the inventive AR coating needs to be electrically conductive, it is understood that, except in the case where all the layers are electrically conductive, the other non-electrically conductive layer(s) of the film can comprise conventional dielectric materials such as titanium dioxide for the high refractive index layer and silicon dioxide for the low refractive index layer. It is further understood that the term "metal oxide" or "metal oxides" generally refers to both electrically conductive and nonconductive metal oxides. Thus, for instance, titanium oxides comprise electrical conductive $TiO_x$ as defined above as well as titanium dioxide (i.e., $TiO_2$) a dielectric. Similarly, silicon oxides comprise electrical conductive $SiO_x$ as defined above as well as silicon dioxide (i.e., $SiO_2$) a dielectric.

In designing and fabricating the multilayer film of an anti-reflection coating, selection of the material(s) for the electrically conductive layer should take into account the electrical conductivities of the various metals available to form suitable metal oxides. Preferably, the electrically conductive high or low refractive materials should be formed from metals having the higher electrical conductivity.

A further method of fabricating electrically conductive materials is to first produce the metal oxide dielectric films and thereafter introduce dopants into the film. The dopant is selected from conductive materials that can be the same material as the metal. This technique is particularly suited if a non-oxide (e.g., $MgF_2$) is employed. The dopant can be introduced by any suitable means including diffusion and ion implantation. See, for example, Wolf & Tauber, "Silicon Processing for the VLSI Era," Vol. 1, pp. 242–332 (1986) which is incorporated herein by reference.

Methodology

The substantially transparent multilayer film structure of the inventive AR coating can be fabricated by conventional film deposition techniques (chemical and physical) including reactive sputter deposition, chemical vapor deposition and electron beam evaporation, with and without ion assist. These techniques are described in "Thin Film Processes" and "Thin Film Processes II," Vossen & Kern, editors (1978 and 1991) Academic Press, which are incorporated herein by reference. The method most suited will depend on, among other things, the substrate (material and size) and the particular conductive metal oxides employed.

Sputtering techniques involve the physical ejection of material from a target as a result of ion bombardment. The ions are usually created by collisions between gas atoms and electrons in a glow discharge. The ions are accelerated into the target cathode by an electric field. A substrate is placed in a suitable location so that it intercepts a portion of the ejected atoms. Thus, a coating is deposited on the surface of the substrate. In reactive sputtering, a reactant gas forms a compound with the material which is sputtered from the target. When the target is silicon and the reactive gas is oxygen, for instance, silicon oxides, usually in the form of $SiO_2$ is formed on the surface of the substrate. Another sputtering technique is to first form a sputtered metal layer on a substrate and thereafter expose this layer to a reactive gas (e.g., oxygen) to form a metal oxide. Sputtering devices are described for instance in U.S. Pat. Nos. 5,047,131, 4,851,095 and 4,166,018, all of which are incorporated herein.

Chemical vapor deposition is the formation of a non-volatile solid film on a substrate by the reaction of vapor phase chemicals (reactants) that contain the required constituents. The reactant gases are introduced into a reaction chamber and are decomposed and reacted by a heated surface to form the thin film.

The conditions required to effect such depositions are well known in the art. For example, chemical vapor deposition, including low-pressure chemical vapor deposition (LPCVD), plasma enhanced chemical vapor deposition (PECVD), photon-induced chemical vapor deposition (PHCVD), and the like, is described by Wolf & Tauber, "Silicon Processing for the VLSI Era," Vol. 1, pp. 161–197 (1986) which is incorporated herein by reference.

Other suitable film deposition techniques include electron beam evaporation and ion-assisted deposition. In electron beam evaporation, an evaporation source (i.e., electron beam) is employed to vaporize the desired target material. The evaporated atoms condense on a substrate situated within the vacuum chamber. See, "Thin Film Processes II" at pages 79–132. In ion-assisted deposition, low-energy ion bombardment of the substrate surface during deposition of evaporated atoms provides surface cleaning, improved nucleation and growth, and in situ annealing which produces evaporated coatings of improved quality. For a discussion of ion-assisted deposition, see Stelmack, et. al., "Review of Ion-Assisted Deposition: Research to Production" Nuclear Instruments and Methods in Physics Research B37/38 (1989) 787–793, which is incorporated herein.

Figure 1:
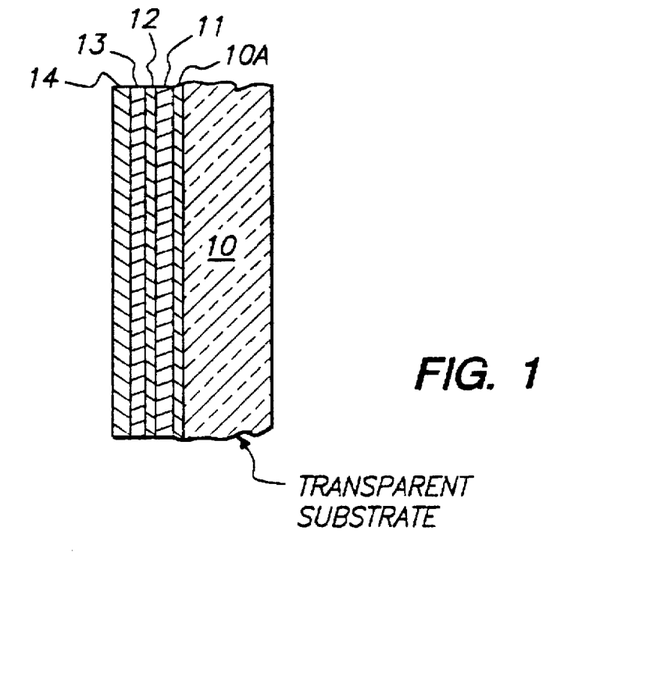
FIG. 1 is a partial cross-sectional view of an ophthalmic lens produced in accordance with this invention.

A preferred embodiment of the invention is illustrated in FIG. 1 which comprises an ophthalmic lens 10 that has a conductive anti-reflection coating disposed on a surface. The coating comprises four transparent, substantially colorless layers 11–14 which are formed of at least two different materials, in which one is a high refractive index material and the other is a low refractive index material. Layers 11–14 comprise an anti-reflection coating which is also referred to as an "AR stack" or "stack." Preferably, prior to forming the AR stack, an adhesion layer 10A comprising chromium oxides is deposited on the substrate surface.

Preferably, the AR stack or coating comprises alternating high and low refractive index materials such that each layer has a refractive index different from that of any adjoining layer. Preferably, the index of refraction of each low refractive index material is less than about 1.5 at a wavelength of about 550 nm, which is a preferred designed wavelength for visible light transmission; the index of refraction of each high refractive index material is greater than about 2.0 at a wavelength of about 550 nm; and, each layer comprises a electrically conductive metal oxide. The first layer of the AR stack, which is formed on the substrate (or on the adhesion promotion layer, which is optional) normally comprises a high index material.

In the embodiment as shown in FIG. 1, layers 11 and 13 comprise high refractive index materials, wherein layer 11 has a thickness of about 7 nm to about 15 nm, more preferably from about 9 nm to about 13 nm and most preferably from about 10 nm to about 12 nm and wherein layer 13 has a thickness of about 90 nm to about 130 nm, more preferably from about 100 nm to about 120 nm and most preferably from about 105 nm to about 115 nm. Layer 11 is designated the first layer of this 4 layer stack. Conversely, layers 12 and 14 comprise a low refractive index material wherein layer 12 has a thickness of about 15 nm to about 40 nm, more preferably from about 20 nm to about 35 nm, and most preferably from about 23 nm to about 31 nm, and wherein layer 14 has a thickness of about 55 nm to about 105 nm, more preferably from about 65 nm to about 95 nm, and most preferably from about 75 nm to about 85 nm.

The multilayer film forming the AR coating can comprise any suitable number of layers of high/low refractive index materials. For most optical applications, it is desirable that the AR coatings reduce the surface reflectance to an extremely low value over an extended spectral region so as to maintain the proper color balance. The number of layers will depend on, among other things, the substrate material, the particular anti-reflection properties desired and compositions of the high and low refractive index materials used. Generally, greater anti-reflection can be achieved by increasing the number of layers of alternating high and low refractive index layers but there is a concomitant decrease in the spectral region of anti-reflection. Furthermore, as described, in U.S. Pat. Nos. 3,432,225 (3-layer design), 3,565,509 (4-layer design), and 5,332,618 (8-layer design), mathematical formulas have been developed to simulate the optics of multilayer anti-reflection coatings so that their design can be optimized.

Experimental

Figure 2:
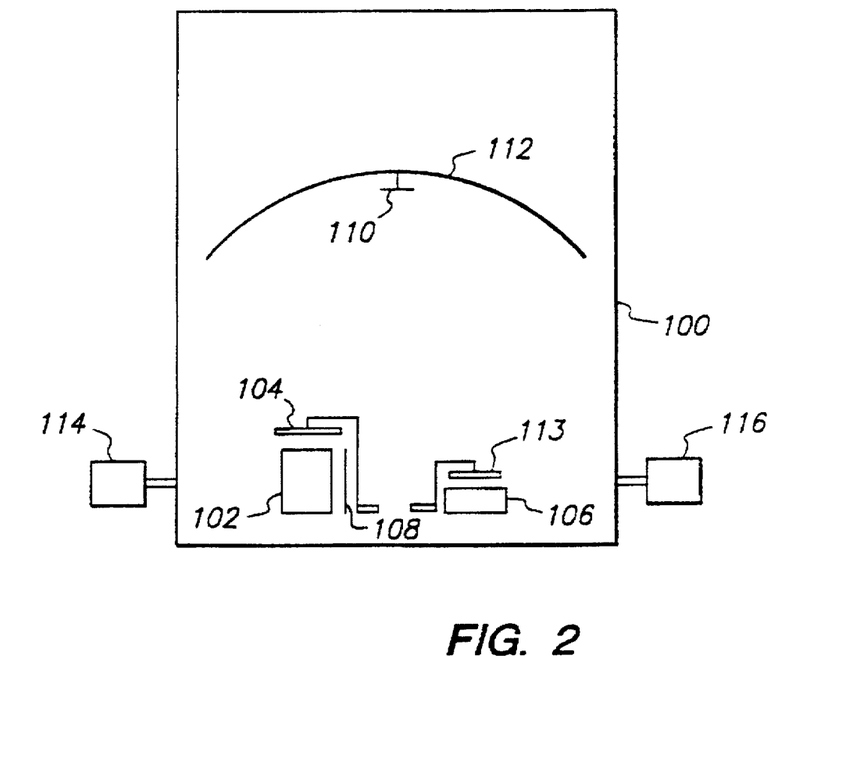
FIG. 2 is a schematic diagram of an ion assisted deposition apparatus employed to produce the anti-reflection coating.
Figure 3:
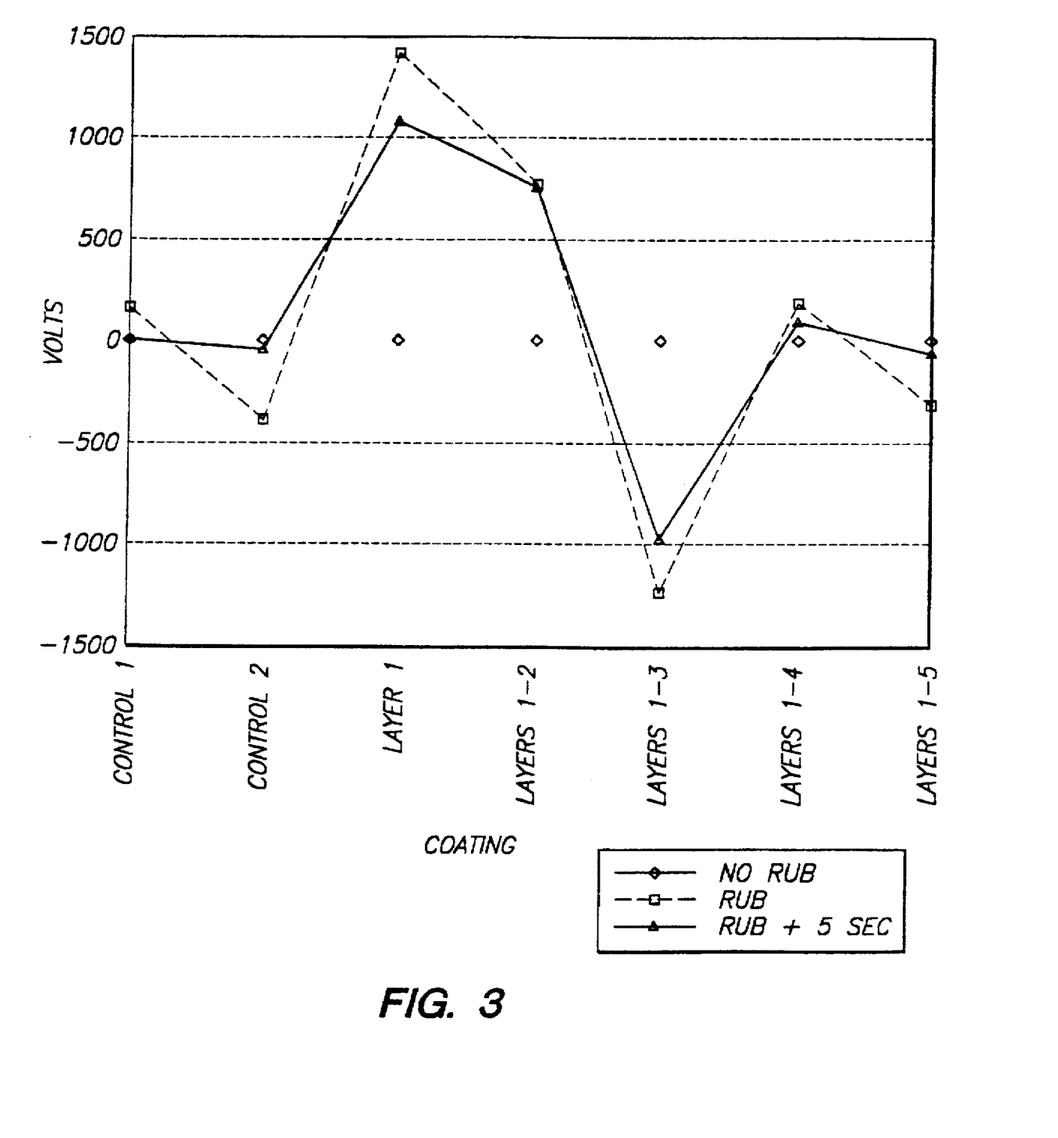
FIG. 3 is a graph of electrostatic potential vs. layers in a coating.

The electron beam ion-assisted deposition apparatus employed to produce AR stacks of the present invention is shown in FIG. 2 and comprises a vacuum chamber 100 which contains ion gun 102 and electron beam evaporation source 106 that are positioned at the base of the vacuum chamber. Baffle 108 separates the ion gun from the E-beam source. Located at the upper portion of the chamber are lens dome 112 and substrate support 110. The vacuum chamber is available from Balzer Ltd., Balzer, Liechtenstein, as model Balzer 1200 Box Coater. It is equipped with a Balzer EBS 420 Electron Beam source. The ion gun is a Commonwealth mark II Ion Source from Commonwealth Scientific Corp., Alexandria, Va.

In operation, a substrate (e.g., ophthalmic lens) is placed on the substrate support and thereafter a vacuum is created and maintained with vacuum pump 114. Initially, the ion gun shutter 104 is closed to prevent ion energy from striking the substrate until the ion gun has stabilized to the preset energy level. Similarly, shutter 113 covers the E-beam source until the target is about to evaporate. Argon is employed as the ionizing gas for the ion gun. Normally, the substrate surface is subject to ion etch prior to deposition of the chromium oxide adhesive layer. To produce a metal oxide layer, the E-beam source is activated to produce a metal evaporant of the requisite concentration. Oxygen from oxygen source 116 reacts with the evaporant to form metal oxide which is deposited on the substrate surface. Subsequent metal oxide layers are produced in a similar manner.

AR coatings having the structure as shown of FIG. 1 were fabricated with the device of FIG. 2. Representative operating parameters in the fabrication of a preferred AR coating and the characteristics of the individual layers are set forth in Table 1. The substrates used were laminated single vision lenses each having a scratch resistant coating.

TABLE 1

| | Material | Thickness (nm) | Index @ 550 nm | QWOT* | $O_2$ Pressure (mbar) | Deposition rate (nm/sec) |
|---|---|---|---|---|---|---|
| Adhes. Layer | Chromium oxide | <1.0 | ~2.50 | | $8 \times 10^{-5}$ | |
| Layer 1 | Titanium oxide ($TiO_x$) | 11.33 | 2.271 | 0.1871 | $2 \times 10^{-4}$ | 0.3 |
| Layer 2 | Silicon dioxide ($SiO_2$) | 27.30 | 1.461 | 0.2901 | | 0.8 |
| Layer 3 | Titanium oxide ($TiO_x$) | 111.07 | 2.271 | 1.8344 | $2 \times 10^{-4}$ | 0.3 |
| Layer 4 | Silicon dioxide ($SiO_2$) | 80.91 | 1.461 | 0.8597 | | 0.8 |

*Quarter Wave Optical Thickness

Prior to commencing deposition, the lens substrates were ultrasonically cleaned using deionized water and then degassed at 95° C. for 2 hours. Thereafter, lenses were loaded on the substrate support and the pressure in the chamber was lowered to about $6 \times 10^{-6}$ mbar. The substrate surface was ion etched for approximately 4 minutes with the ion gun operating at 0.9 A/110 V. In forming the adhesive layer, chromium target material was initially covered with shutter 113 as the chromium is heated by the electron beam from the E-beam evaporation source. The shutter was removed before the chromium evaporated. During the formation and deposition of the chromium oxide layer, oxygen was introduced sufficient to raise and maintain the chamber pressure to $8 \times 10^{-4}$ mbar. As is apparent, the ion gun shutter was also removed during deposition. The succeeding 4 layers that comprise the AR coating were deposited in a similar manner. Preferably, the overall pressure of the vacuum chamber is maintained at about $2 \times 10^{-4}$ mbar or less throughout the deposition of each of the layers. The second titanium oxide layer (layer 3) of the AR coating formed was found to be electrically conductive.

Lenses coated with the inventive AR coating of Table 1 were tested for anti-static properties. To induce electrostatic charge buildup, the coatings were rubbed with a lint-free cotton cheesecloth and a 100% polyester Luminex® (Toray Industries, Inc., Tokyo, Japan) lens cleaning cloths. Measurements were conducted in two separate environments: with and without air conditioning. Air conditioning tends to reduce the amount of moisture in the air and thereby affect static properties. Three measurements were made for each lens. Prior to any rubbing, the lenses were taken out of their packaging and allowed to acclimate to the environment for at least 30 minutes. The voltages on the front surfaces were then measured with a TI 300 static meter (Static Control Services, Inc., Palm Springs, Calif.). Next, each lens was rubbed for ten strokes (back and forth—four inches each way) on the appropriate cloth, and the electrostatic measurement was made immediately. The third measurement was made following a five seconds interval after the lenses were rubbed. Between each measurement, the lenses were placed in front of an Endstat 2000 Deionizer (Static Control Services, Inc.) to eliminate any residual static charges.

The measurements, which are set forth in Table 2, demonstrate that lenses coated with the inventive AR coating developed insignificant or no electrostatic charge.

TABLE 2

| | NO RUB | RUB | RUB + 5 SEC |
|---|---|---|---|
| Without Air Conditioning | | | |
| Cotton Cheesecloth | 0 | -50 | 0 |
| Polyester Cloth | 0 | 100 | 0 |
| With Air Conditioning | | | |
| Cotton Cheesecloth | 0 | -100 | -25 |
| Polyester Cloth | 0 | 0 | 0 |

(Measurements were made in volts)

Laminated single vision lenses each having a scratch resistant coating and coated with conventional anti-reflection coatings that included a hydrophobic outer layer were also tested for anti-static properties in the manner described above. These "stock" lenses were available from various ophthalmic lens manufacturers. The results are shown in Tables 3 through 6. The degree of hydrophobicity of the outer surface of each AR coating is proportional to its contact angle which was measured with a Tantec Angle Meter, available from Tantec Inc., Schaumberg, Ill.

Tables 3 (cotton cheesecloth) and 4 (polyester cloth) comprise measurements taken in a room without air conditioning. Similarly, Tables 5 (cotton cheesecloth) and Table 6 (polyester cloth) comprise measurements taken in one with air conditioning. (Measurements were made in volts). As is apparent, lens number 1 in each of Tables 3–6 corresponds to the appropriate inventive lens in Table 2. Lens 2–7 of Table 3 had the same anti-reflection coatings as lens 2–7 of Table 4, respectively. Similarly, lens 2–9 of Table 5 had the same anti-reflection coatings as lens 2–9 of Table 6, respectively.

As is apparent from the comparative dam, the inventive AR coating demonstrated superior anti-static properties compared to the prior an anti-reflection coatings available from ophthalmic lens manufacturers. Furthermore, the inventive AR coating does not require an outer hydrophobic coating which is present in all of the conventional AR coatings tested.

TABLE 3

| Lenses | No Rub | Rub | Rub + 5 sec | Contact Angle |
|---|---|---|---|---|
| 1 | 0 | -50 | 0 | 31° |
| 2 | -150 | -700 | -200 | 100° |

TABLE 3-continued

| Lenses | No Rub | Rub | Rub + 5 sec | Contact Angle |
|---|---|---|---|---|
| 3 | 0 | −950 | −300 | 95° |
| 4 | −250 | −1000 | −500 | 100° |
| 5 | −213 | −2375 | −1000 | 95° |
| 6 | −350 | −3250 | −2000 | 95° |
| 7 | −700 | −4500 | −2000 | 81° |

TABLE 4

| Lenses | No Rub | Rub | Rub + 5 sec | Contact Angle |
|---|---|---|---|---|
| 1 | 0 | 100 | 0 | 31° |
| 2 | −150 | −950 | −325 | 100° |
| 3 | 0 | −1350 | −150 | 95° |
| 4 | −250 | −1000 | −500 | 100° |
| 5 | −213 | −4500 | −2750 | 95° |
| 6 | −350 | −5500 | −4000 | 95° |
| 7 | −700 | −3000 | −2250 | 81° |

TABLE 5

| Lenses | No Rub | Rub | Rub + 5 sec | Contact Angle |
|---|---|---|---|---|
| 1 | 0 | −100 | −25 | 31° |
| 2 | −100 | −800 | −500 | 100° |
| 3 | −150 | −1750 | −850 | 100° |
| 4 | 0 | −2000 | −700 | 95° |
| 5 | −450 | −3500 | −2250 | 81° |
| 6 | −163 | −4500 | −3250 | 95° |
| 7 | −500 | −6500 | −5000 | 95° |
| 8 | −250 | −8500 | −6000 | 100° |
| 9 | −1250 | −10000 | −9500 | 95° |

TABLE 6

| Lenses | No Rub | Rub | Rub + 5 sec | Contact Angle |
|---|---|---|---|---|
| 1 | 0 | 0 | 0 | 31° |
| 2 | −100 | −2250 | −450 | 95° |
| 3 | −150 | −1250 | −600 | 100° |
| 4 | 0 | −2750 | −650 | 100° |
| 5 | −163 | −4500 | −2250 | 81° |
| 6 | −500 | −5875 | −3500 | 95° |
| 7 | −450 | −10000 | −6000 | 95° |
| 8 | −250 | −8000 | −5000 | 100° |
| 9 | −1250 | −10000 | −9500 | 95° |

Layer-by-layer Analysis of AR Coating

To determine what significant effect, if any, the individual layers of the AR coating had on the anti-static properties of AR coatings, a layer-by-layer analysis of the AR coating having the five layer structure described in Table 1 was conducted. In this analysis, five plastic front wafers were coated, each having a different number of layers. (The wafers used were plastic and coated with a scratch resistant polymeric layer.) The first wafer was coated with (1) the chromium oxide adhesion layer only. The second wafer was coated with (1) the chromium oxide adhesion layer and (2) first $TiO_x$, and so on, so that the fifth wafer comprised the five layer structure.

After formation of the five coated wafers, the voltage on the front surfaces of each wafer was measured with a TI 300 static meter. Each wafer was rubbed for ten strokes (back and forth—four inches each way) on a lint-free cotton cheesecloth and the measurements were made immediately. In the third test, five seconds lapsed after the lenses were rubbed, before being measured. As a control, the electrostatic voltages of two plastic front wafers (i.e., controls 1 and 2) were also measured. Each control wafer was coated with a different scratch resistant polymeric coating. The five wafers tested had the same scratch resistant polymer coating as control 1.

It was found that the electrostatic charge remained high for the first, second, and third wafers; however, the fourth wafer which comprised: (1) the chromium oxide adhesive layer, (2) the first $TiO_x$ layer, (3) the first $SiO_2$ layer, and (4) the second $TiO_x$ layer, showed a dramatic reduction is electrostatic charge. Analysis showed that for the second $TiO_x$ layer, x was about 1.78. Thus, at least with respect to AR coatings having alternating high and low refractive index materials comprising titanium oxides and silicon oxides, the second high refractive index material preferably is $TiO_x$ wherein, x is about 1.3 to about 1.9995, more preferably about 1.5 to about 1.9995, and most preferably about 1.7 to about 1.9995.

It should be emphasized that while the examples shown herein comprise only two different high and low index materials (i.e., $SiO_x$ and $TiO_x$) in the particular design, similar anti-reflection coating structures could be designed with two or more high index materials and/or two or more low index materials, or even a material such as aluminum oxide of some intermediate refractive index.

Furthermore, in certain cases, it may be advantageous to use mixtures of materials or complex compounds. A mixture of cerium oxide and zinc oxide could be used for the high index films and a mixture of silicon dioxide and magnesium fluoride for the low index films. Other mixtures might be chosen to suit a particular deposition technique or to take advantage of a particular optical or physical property of a material.

Ophthalmic lens having the anti-reflection coating preferably has a transmittance at 550 nm of between about 98.0 to about 99.5%, more preferably between about 98.5 to about 99.5%, and most preferably between about 99.0 to about 99.5%. Moreover, the ophthalmic lens has a reflectance at 550 nm of between about 0.5 to about 2.0%, more preferably between about 0.5 to about 1.5%, and most preferably between about 0.5 to about 1.0%.

Although only preferred embodiments of the invention are specifically disclosed and described above, it will be appreciated that many modifications and variations of the present invention are possible in light of the above teachings and within the purview of the appended claims without departing from the spirit and intended scope of the invention.

What is claimed is:

1. A method of fabricating a high transmittance ophthalmic lens which comprises the steps of:

providing a transparent ophthalmic lens; and forming, on a surface of said ophthalmic lens, a transparent, electrically conductive and substantially static resistant anti-reflection coating by reacting a metal with an effective non-stoichiometric amount of oxygen such that the coating comprises at least one layer of electrically conductive metal oxide material.

2. The method of claim 1 wherein the coating of the ophthalmic lens in the neutral state has an electric potential that is less than about 100 volts.

3. The method of claim 2 wherein the coating surface has an electric potential that is less than about 600 volts when measured immediately after being rubbed with a cloth.

4. The method of claim 3 wherein the coating surface has an electric potential that is less than about 100 volts within about 5 seconds of being rubbed by the cloth.

5. The method of claim 4 wherein the ophthalmic lens does not include a hydrophobic outer layer over the anti-reflection coating.

6. The method of claim 1 wherein said coating is formed by electron beam ion-assisted deposition.

7. A method of fabricating a high transmittance ophthalmic lens which comprises the steps of:
  providing a transparent ophthalmic lens; and
  forming, on a surface of said ophthalmic lens, a transparent, multilayer, substantially static resistant, anti-reflection coating wherein at least one layer is electrically conductive by reacting a metal with an effective non-stoichiometric amount of oxygen such that the coating comprises at least one layer of electrically conductive metal oxide material.

8. The method of claim 7 wherein each of the at least one electrically conductive layer is formed by electron beam evaporation whereby metal reacts with non-stoichiometric amounts of oxygen to form an electrically conductive metal oxide.

9. The method of claim 7 wherein each of the at least one electrically conductive layer is a high refractive index material that comprises niobium oxides.

10. The method of claim 7 wherein each of the at least one electrically conductive layer is a high refractive index material that comprises titanium oxides.

11. The method of claim 7 wherein the multilayer anti-reflection coating comprises alternating high and low refractive index materials such that each layer has a refractive index different from that of any adjoining layer, wherein the index of refraction of each low refractive index material is less than about 1.5 at a wavelength of about 550 nm, wherein the index of refraction of each high refractive index material is greater than about 2.0 at a wavelength of about 550 nm, and wherein at least one layer comprises an electrically conductive metal oxide material.

12. The method of claim 11 wherein the high refractive index material comprises titanium oxides and wherein the low refractive index material comprises silicon oxides.

13. The method of claim 11 wherein the high refractive index material comprises niobium oxides and wherein the low refractive index material comprises silicon oxides.

14. The method of claim 11 wherein the multilayer anti-reflection coating comprises:
  (i) a first layer having an index of refraction from about 2.0 to about 2.55 and that is about 7 to about 15 nm thick;
  (ii) a second layer having an index of refraction from about 1.38 to about 1.5 and that is about 15 to about 40 nm thick;
  (iii) a third layer having an index of refraction from about 2.0 to about 2.55 and that is about 90 to about 130 nm thick; and
  (iv) a fourth layer having an index of refraction from about 1.38 to about 1.5 and that is about 55 to about 105 nm thick, wherein the indices of refraction are measured at a reference wavelength of 550 nm.

15. The method of claim 14 wherein the third layer is electrically conductive.

16. The method of claim 11 further comprising the step of depositing an adhesion layer onto the ophthalmic lens surface prior to forming said multilayer anti-reflection coating thereon.

17. The method of claim 7 wherein the at least one electrically conductive layer is formed by reactive sputtering whereby metal reacts with non-stoichiometric amounts of oxygen.

18. The method of claim 7 wherein the coating has a thickness of about 200 to about 500 nm.

19. The method of claim 7 wherein the at least one conductive layer is formed by ion-assisted deposition.

20. The method of claim 7 wherein the at least one conductive layer is formed by electron beam ion-assisted deposition.

21. The method of claim 7 wherein the at least one conductive layer is formed by reactive sputtering.

22. A high transmittance ophthalmic lens comprising:
  an ophthalmic lens substrate; and
  a transparent, substantially static resistant multilayer film comprising alternating layers of high refractive index and low refractive index materials, wherein at least one layer of the multilayer film is electrically conductive wherein the multilayer film comprises alternating high and low refractive index materials such that each layer has a refractive index different from that of any adjoining layer, wherein the index of refraction of each low refractive index material is less than about 1.5 at a wavelength of about 550 nm, wherein the index of refraction of each high refractive index material is greater than about 2.0 at a wavelength of about 550 nm, and wherein said at least one electrically conductive layer comprise non-stoichiometric metal oxides.

23. The ophthalmic lens of claim 22 wherein the high refractive index material comprises niobium oxides.

24. The ophthalmic lens of claim 22 wherein the high refractive index material comprises titanium oxides.

25. The ophthalmic lens of claim 22 wherein the high refractive index material comprises titanium oxides and wherein the low refractive index material comprises silicon oxides.

26. The ophthalmic lens of claim 22 wherein the high refractive index material comprises niobium oxides and wherein the low refractive index material comprises silicon oxides.

27. The ophthalmic lens of claim 22 further comprises an adhesion layer interposed between the substrate and the multilayer film.

28. The ophthalmic lens of claim 22 wherein the multilayer film comprises:
  (i) a first layer having an index of refraction from about 2.0 to about 2.55 and that is about 7 to about 15 nm thick;
  (ii) a second layer having an index of refraction from about 1.38 to about 1.5 and that is about 15 to about 40 nm thick;
  (iii) a third layer having an index of refraction from about 2.0 to about 2.55 and that is about 90 to about 130 nm thick; and
  (iv) a fourth layer having an index of refraction from about 1.38 to about 1.5 and that is about 55 to about 105 nm thick, wherein the indices of refraction are measured at a reference wavelength of 550 nm.

29. The ophthalmic lens of claim 28 wherein the third layer is electrically conductive.

30. The ophthalmic lens of claim 28 further comprises an adhesion layer situated between the substrate surface and the multilayer film.

31. The ophthalmic lens of claim 28 wherein the multilayer film of the ophthalmic lens in the neutral state has an electric potential that is less than about 100 volts.

32. The ophthalmic lens of claim 31 wherein the multilayer film surface has an electric potential that is less than about 600 volts when measured immediately after being rubbed with a cloth.

33. The ophthalmic lens of claim 32 wherein the multilayer film surface has an electric potential that is less than about 100 volts within about 5 seconds of being rubbed by the cloth.

34. The ophthalmic lens of claim 33 wherein the ophthalmic lens does not include a hydrophobic outer layer over the multilayer film.

35. An ophthalmic lens fabricated by a process that comprises the steps of:

providing a transparent ophthalmic lens substrate; and depositing, onto a surface of said substrate, a transparent, substantially static resistant multilayer anti-reflection coating wherein at least one layer is electrically conductive wherein the step of depositing said coating comprises reacting metal with an effective non-stoichiometric amount of oxygen to form a layer of electrically conductive metal oxide.

36. The lens of claim 35 wherein the layer of electrically conductive metal oxide is formed by electron beam evaporation.

37. The lens of claim 35 wherein the layer of electrically conductive metal oxide is formed by reactive sputtering.

38. The lens of claim 35 wherein the layer of electrically conductive metal oxide layer is formed by ion-assisted deposition.

39. The lens of claim 35 wherein the layer of electrically conductive metal oxide layer is formed by electron beam ion-assisted deposition.

40. An ophthalmic lens fabricated by a process that comprises the steps of:

providing a transparent ophthalmic lens substrate; and depositing, onto a surface of said substrate, a transparent, substantially anti-static multilayer film comprising alternating layers of high refractive index and low refractive index materials wherein at least one layer is electrically conductive wherein the multilayer film comprises: alternating high and low refractive index materials such that each layer has a refractive index different from that of any adjoining layer, wherein the index of refraction of each low refractive index material is less than about 1.5 at a wavelength of about 550 nm, wherein the index of refraction of each high refractive index material is greater than about 2.0 at a wavelength of about 550 nm.

41. The ophthalmic lens of claim 40 wherein the multilayer film of the ophthalmic lens in the neutral state has an electric potential that is less than about 100 volts.

42. The lens of claim 40 wherein the high refractive index material comprises titanium oxides and wherein the low refractive index material comprises silicon oxides.

43. The lens of claim 40 wherein the high refractive index material comprises niobium oxides and wherein the low refractive index material comprises silicon oxides.

44. The lens of claim 40 wherein the multilayer film comprises:

(i) a first layer having an index of refraction from about 2.0 to about 2.55 and that is about 7 to about 15 nm thick;

(ii) a second layer having an index of refraction from about 1.38 to about 1.5 and that is about 15 to about 40 nm thick;

(iii) a third layer having an index of refraction from about 2.0 to about 2.55 and that is about 90 to about 130 nm thick; and (iv) a fourth layer having an index of refraction from about 1.38 to about 1.5 and that is about 55 to about 105 nm thick, wherein the indices of refraction are measured at a reference wavelength of 550 nm.

45. The lens of claim 44 wherein the third layer is electrically conductive.

46. The lens of claim 44 further comprising an adhesion layer situated between the substrate surface and the multilayer film.

47. The lens of claim 46 wherein the coating is formed by electron beam ion evaporation.

* * * * *